United States Patent [19]
Wolfe et al.

[11] Patent Number: 5,971,681
[45] Date of Patent: Oct. 26, 1999

[54] DRAWBAR GUIDE RING WITH DRIVE KEYS

[75] Inventors: Ingo E. Wolfe, Brooklyn Park; Roger J. Schroeder, Coon Rapids, both of Minn.

[73] Assignee: Kurt Manufacturing Company, Inc., Fridley, Minn.

[21] Appl. No.: 08/953,960

[22] Filed: Oct. 10, 1997

[51] Int. Cl.⁶ .................................................. B23C 1/00
[52] U.S. Cl. .......................... 409/233; 279/102; 279/148; 279/157; 408/239 R; 409/131; 409/231; 409/234
[58] Field of Search ..................................... 409/131, 134, 409/230, 231, 232, 233, 234; 279/102, 142, 143, 148, 157, 158; 408/238, 239 R, 239 A, 240

[56] References Cited

U.S. PATENT DOCUMENTS

| | | | |
|---|---|---|---|
| 4,298,208 | 11/1981 | Benjamin et al. | 409/234 |
| 4,436,463 | 3/1984 | Rea | 409/232 |
| 4,583,890 | 4/1986 | Ewing et al. | 409/234 |
| 4,583,892 | 4/1986 | Armbruckner | 409/231 |
| 4,632,614 | 12/1986 | Rall et al. | 409/233 |
| 4,951,578 | 8/1990 | Von Haas et al. | 409/231 |
| 5,009,555 | 4/1991 | Kitamura | 409/232 |
| 5,022,278 | 6/1991 | DeCaussin | 409/233 |
| 5,265,990 | 11/1993 | Kuban | 409/232 |

*Primary Examiner*—Daniel W. Howell
*Assistant Examiner*—Christopher Kirkman
*Attorney, Agent, or Firm*—Westman, Champlin & Kelly, P.A.

[57] ABSTRACT

A guard ring having a center bore mounts on a face of a spindle of a machine tool having a taper socket drive, and a bore for receiving and driving a tool holder. A drive between the guard ring and the tool holder engages before a power drawbar of the machine tool spindle engages the tool holder. The guard ring is of an axial length such that the tool holder is within the center bore of the guard ring before the tool holder is driven by the power drawbar of the machine tool.

5 Claims, 5 Drawing Sheets

DRAWBAR GUIDE RING WITH DRIVE KEYS

BACKGROUND OF THE INVENTION

The present invention relates to a guard ring used during coupling of a tool holder to a power drawbar of a machine tool spindle that shields the facing surfaces of a tool flange and spindle face that move together as the tool holder is tightened in place.

Presently machine tools using a standard taper drive tool system with a power drawbar to pull the tool holder and tool into the tapered socket on the spindle. The tool holder has a flange that surrounds the tapered shank of the tool holder which moves close to contact with the spindle face. The space between the flange and surface is close enough to pinch a careless finger.

Another problem with a standard tool system is that the power drawbar can rotate the tool holder when the threads of the drawbar and tool holder engage, which in the standard system, is before the tool holder is drivably engaged with the spindle. Particularly if the threads bind, the torque on the tool holder can cause it to spin and release from hand holding force.

Thus a guard for that not only covers the gap under the spindle face but also provides driving engagement between the spindle and tool before the drawbar and tool holder threads engage eliminates those problems.

SUMMARY OF THE INVENTION

The present invention relates to a guard ring that drivably mounts onto the spindle of a machine tool having a tapered tool drive (for example a standard #40 taper drive) and when a tool holder having a tapered shank of standard length is inserted into the spindle, the tool holder flange will slip into the ring before the threaded power drawbar bolt threads engage the internal threads of the tool holder. The internal surface of the guard ring has at least one internally protruding drive lug that will fit into a keyway on the tool holder. This means that there is a driving engagement between the spindle (through the guard ring) and the tool holder at the time the drawbar starts to thread into the tool holder.

The guard ring is simple to make and easily adapts to a standard machine tool spindle. The guard ring can be an extrusion cut to the desired axial length, and once one end is machined to provide drive keys for the spindle and attachment bolt holes are bored it is ready to use. The exterior surface of the guard ring can be knurled for gripping if desired.

DETAILED DESCRIPTION OF THE PREFERRED EMBODIMENTS

Figure 1:
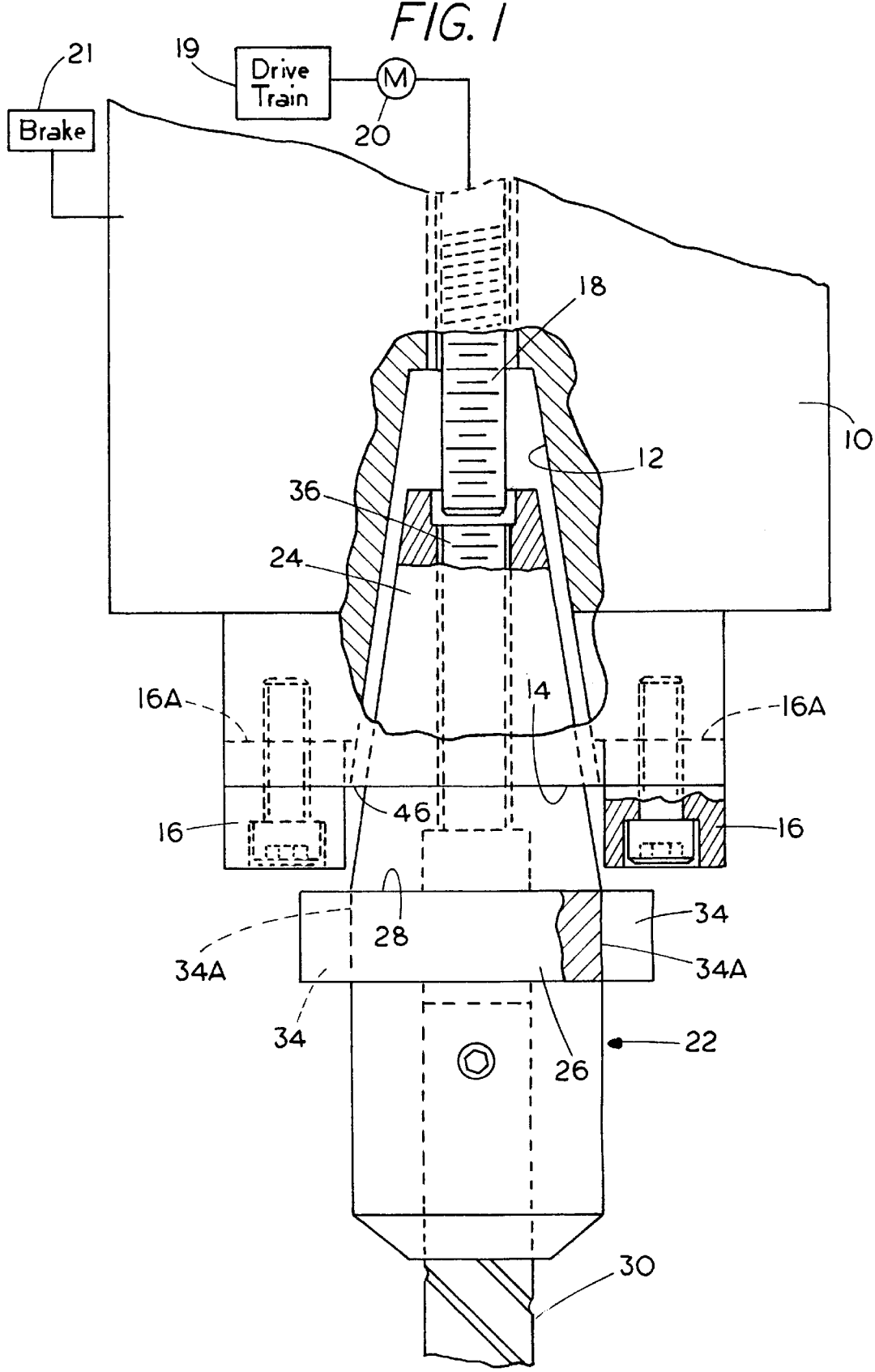
FIG. 1 is an exploded side view of an existing machine tool spindle with a taper drive and a mating tool holder, showing a space between facing surfaces which move together as the shank on the tool holder is seated.

A conventional machine tool spindle 10 has a standard #40 taper drive socket 12 therein extending in from a spindle face surface 14. The spindle has aligning drive keys 16 on opposite sides of the socket 12 that extend outwardly from the spindle face. These drive keys are spaced apart 180° and extend a short peripheral distance. The keys 16 fit into sockets or keyways 16A in the spindle.

A power driven, threaded drawbar bolt 18 of conventional design is provided in a center bore of the spindle and it has an end protruding into the tapered socket 12. The drawbar bolt 18 is powered from the machine tool motor 20, which also drives the spindle 10 through a separate drive train 19. The spindle 10 also is held from rotation by a brake 21 when the tool holder is being changed.

The spindle 10 receives a tool holder 22 that has a tapered drive shank 24 that will seat in the socket 12 so the tool holder is driven by the spindle 10. The tool holder 22 has a flange 26 with a flange surface 28 that faces the spindle face surface 14.

The tool holder 22 mounts a tool 30 (shown fragmentarily) that is used for boring a hole or performing some other operation on a workpiece in the machine tool. The flange of the tool holder 22 has keyways 34 that will receive the keys 16 to form a driving engagement before the tapered shank 24 and socket 12 fully seat.

In the standard spindle arrangements the tool holder shank 24 is moved into the socket 12 manually until an internally threaded bore 36 in the tool holder shank 24 is engaged by the drawbar bolt 18.

Figure 4:
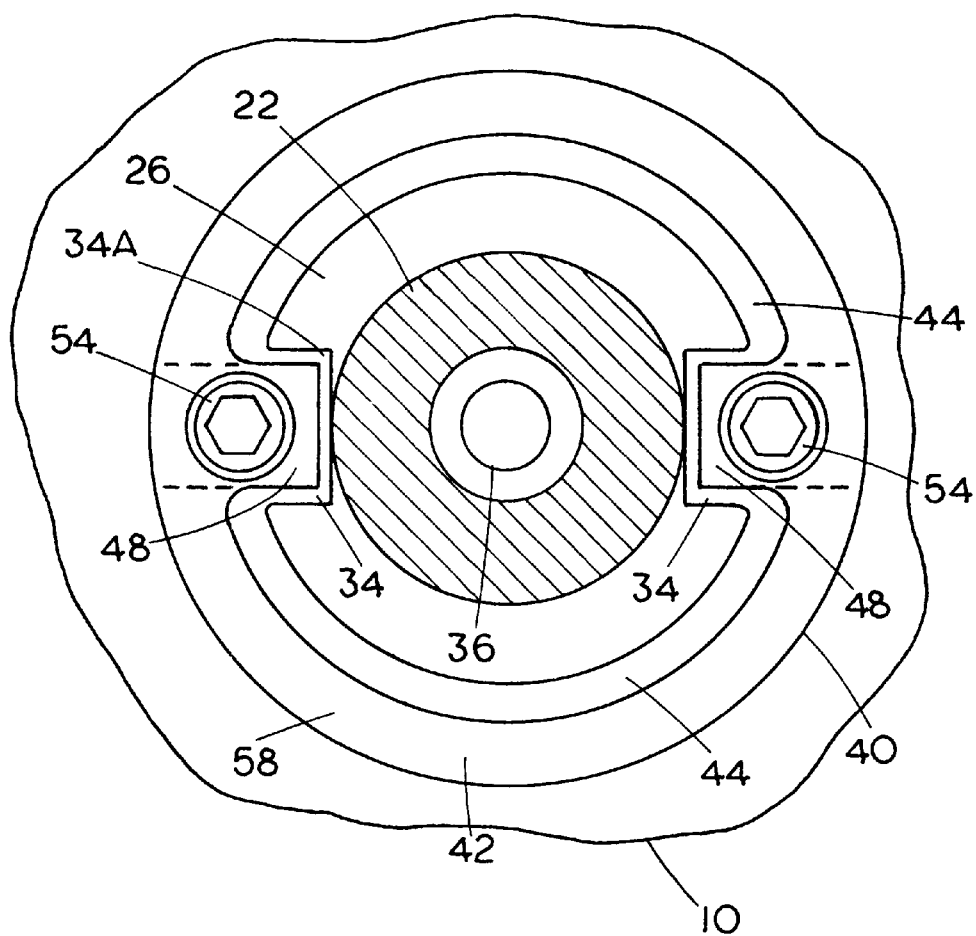
FIG. 4 is a sectional view taken on line 4—4 in FIG. 3.

FIG. 1 illustrates the tool holder positioned just before the drawbar 18 engages the threads in bore 36. The bore 36 has a countersunk recess at its upper end. The threads of the drawbar 18 and the bore 36 will engage before the keys 16 enter the keyways or key pockets 34 in the flange 26. The position and size of the key pockets 34 (and thus keys 16) is shown in FIG. 4.

In FIGS. 2–6 the guard ring 40 of the present invention is shown. The guard ring 40 has an outer ring body 42 that defines a bore 44 that aligns with the opening or port 46 at the open end of the spindle socket 12. The guard ring has a pair of drive lugs 48 aligned on a diameter line on the ring that protrude into the keyway 16A in the face 14 (see FIG. 4). The space between these lugs is the same size or slightly larger than the keyway bottom 34A of the holder 22. The lugs or keys are positioned in the same location and are essentially the same size as keys 16. There are also keys 50 that extend above the upper plane of the ring body 42 and which are over the lugs or keys 48. The keys 50 fit into the keyways 16A in the spindle for driving engagement.

Figure 2:
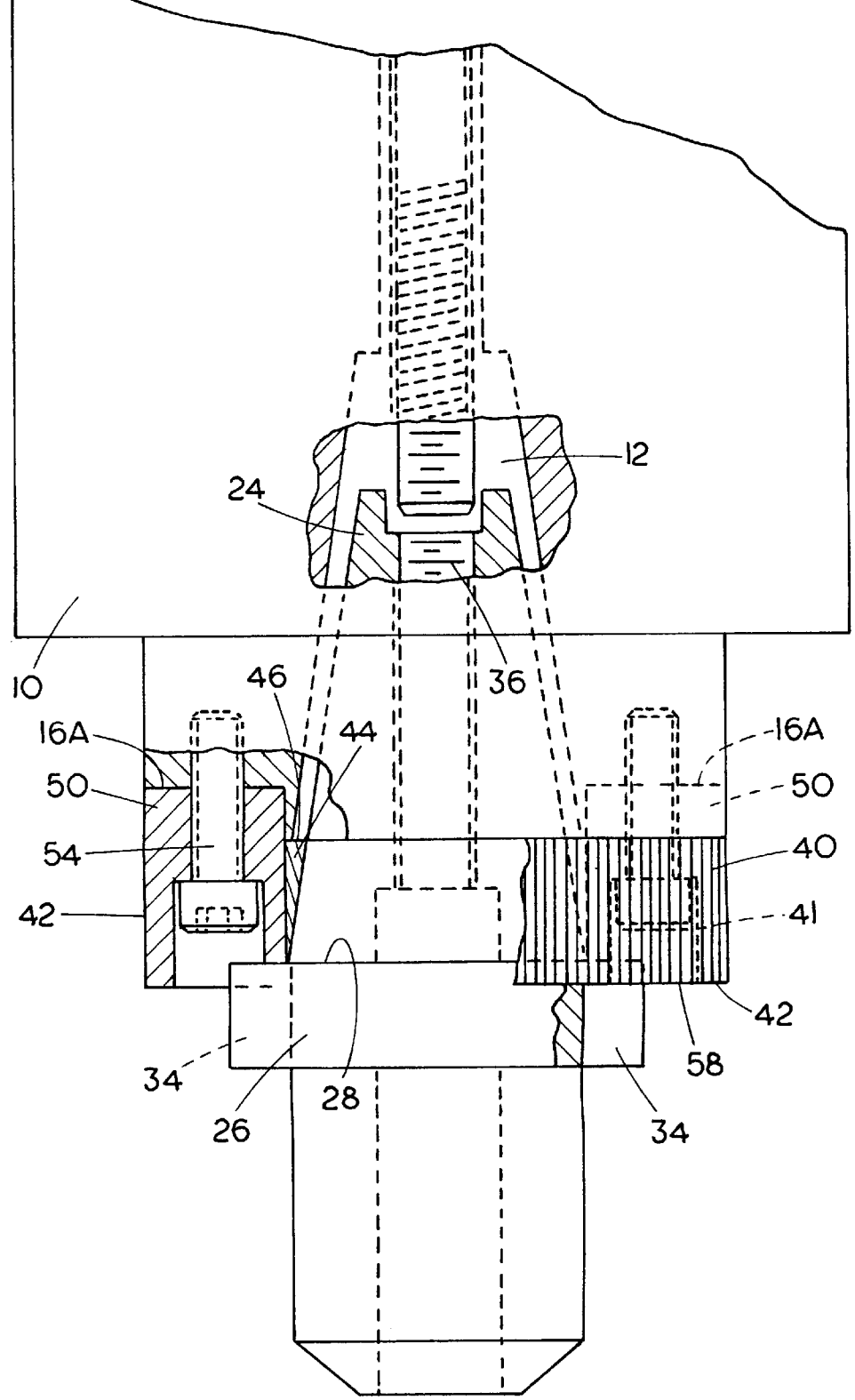
FIG. 2 is a side view if a spindle and tool holder with a guard ring of the present invention in place inserted to position slightly before engagement of a power drawbar with interior threads of the tool holder.
Figure 3:
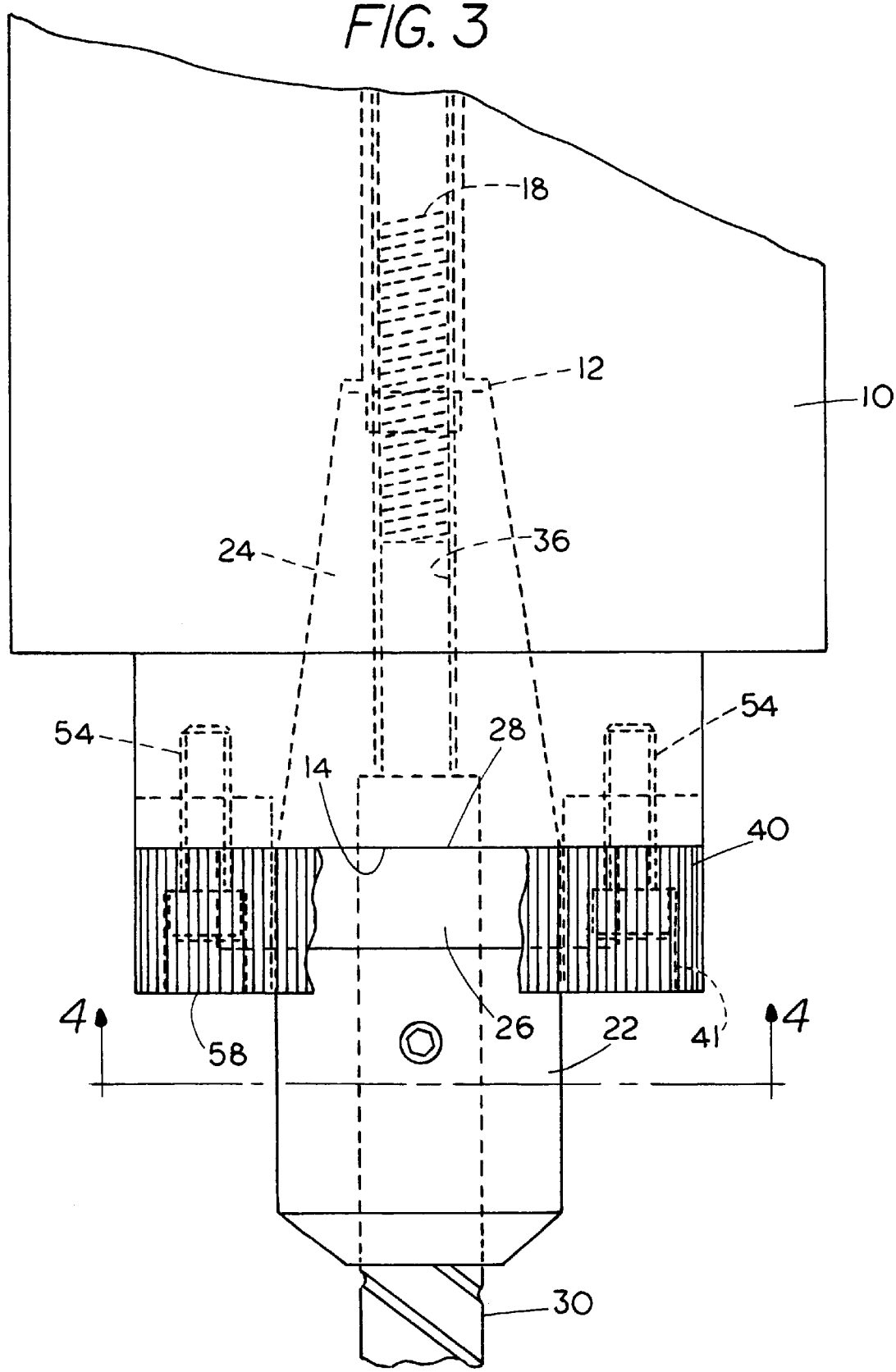
FIG. 3 is a view similar to FIG. 2 with a tool holder drivably seated in the spindle tapered socket.

The guard ring 40 also has counterbored apertures that receive cap screws 54 that thread into bores in the end of the spindle 10, as shown in FIGS. 2 and 3. The guard ring 40 is thus drivably mounted on the spindle and provides a lower surface 58 that is parallel to but spaced from surface 14 of the spindle.

The tool holder 22 is shown in FIG. 2 as it is inserted into the guard ring 40 and the drive socket 12. The keyways 34 on the tool holder 22 will slide onto the keys or lugs 48 as the tool holder is moved into the bore 44 of the guard ring 40. Thus there is a drive connection between the spindle 10 and the tool holder 22 before the threaded drawbar 18 engages the threads in the bore 36 of the tool holder. There is no possibility of the tool holder 22 spinning unless the spindle 10 spins. The spindle is braked by brake mechanism 21 on the machine tool during the tool holder change.

Also, it an be seen in FIG. 2 that the surface 28 of the tool holder flange is inside the bore 42 of the guard ring 46 and before the drawbar 18 engages the threads in bore 36 there can be no pinching of skin or fingers between the surface 58 and the flange surface 28 wherein the drawbar does engage the threads in bore 36 and is used to pull the tool holder spindle into the socket 12.

In FIG. 3, the tool holder 22 is shown fully seated in the socket 12. The drive for the tool holder and tool is through the tapered socket 12 and shank 24.

Figure 6:
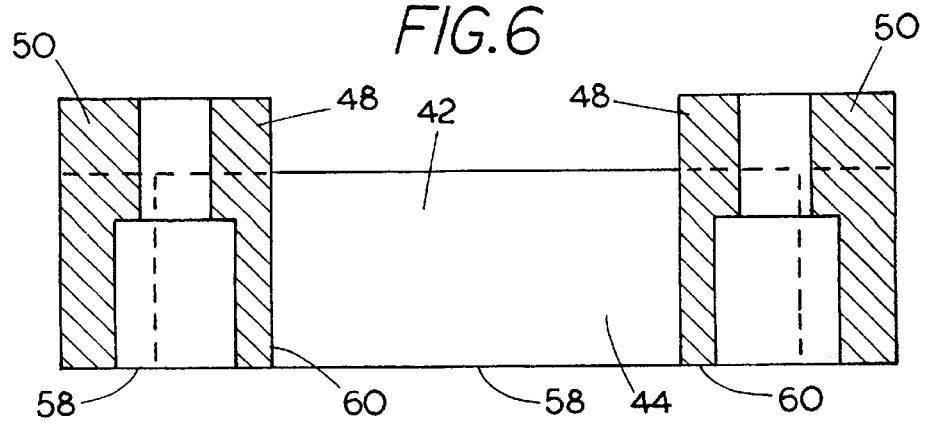
FIG. 6 is a sectional view taken on line 6—6 in FIG. 5.

In FIG. 6, it can be seen that the lower corner edges 60 of the lugs or keys 48 are beveled to aid in slipping the keys 48 into the keyways 34 of the tool holder 22 into position.

Figure 5:
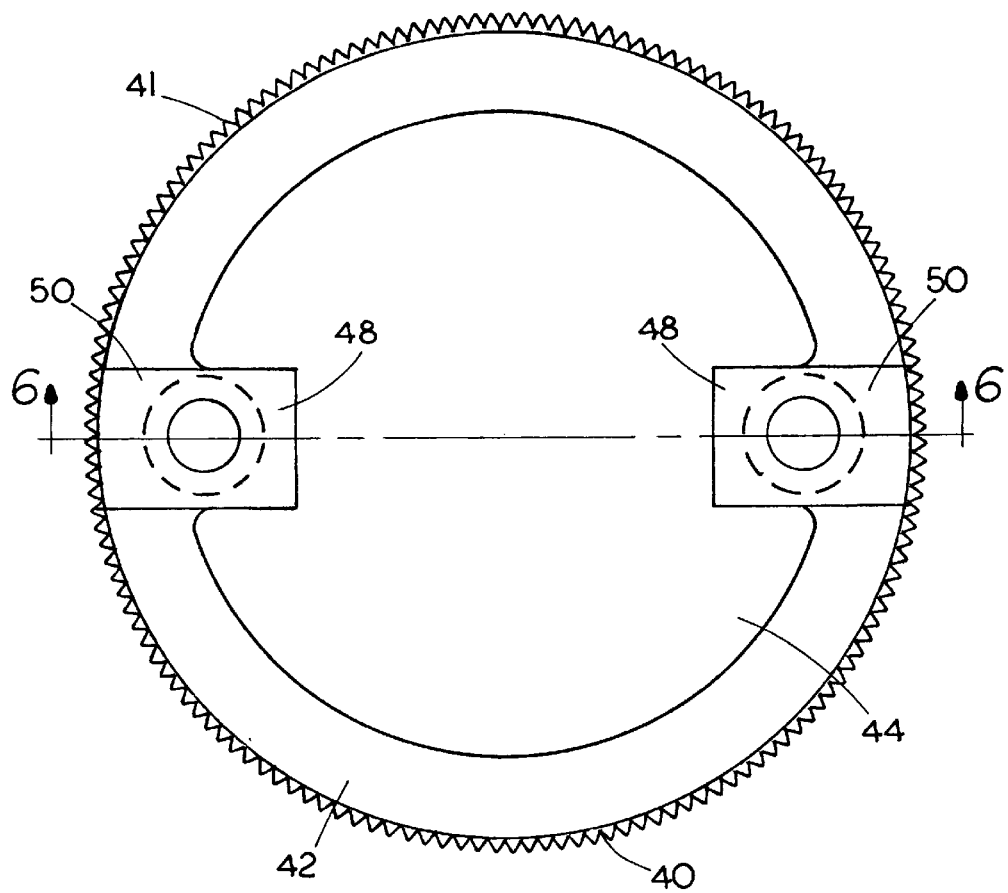
FIG. 5 is a top plan view of the guard ring of the present invention.

The guard ring has shallow serrations 41 on its outer surface shown schematically in FIGS. 2, 3 and 5 to aid in rotating the spindle by hand during machine set up. The guard ring is thus a simple and convenient unit for solving existing problems in installing the tool holders into machine tool spindles.

Although the present invention has been described with reference to preferred embodiments, workers skilled in the art will recognize that changes may be made in form and detail without departing from the spirit and scope of the invention.

What is claimed is:

1. A guard ring for mounting on a spindle of a machine tool having a tapered drive socket, said spindle having an outer end face, a power drawbar rotatably mounted in the spindle drive socket, the power drawbar terminating spaced inwardly from the face of the spindle, said guard ring comprising a ring body having a first surface that mates with the face of the spindle, a fastener to secure the ring body to the spindle with the surface of the ring body against the face of the spindle, said ring body defining a bore of a first diameter of size to encircle the drive socket, a tapered outer surface drive member for seating in the tapered drive socket, the tapered drive member having a surface that passes through the ring body bore, a drive element on the ring body comprising one of a lug and a keyway facing a central axis of the ring body bore, the drive member having the other drive element of the lug and the keyway, the ring body having a length along the central axis to space a second surface of the ring body from the first surface sufficiently so the other drive element on the drive member engages the one drive element on the ring body before the drive member engages the power drawbar as the drive member is moving toward the power drawbar.

2. The guard ring of claim 1, wherein the ring body has a serrated outer surface.

3. In combination with a rotating spindle having a tapered internal drive socket, and a power drawbar rotatably mounted to extend into the tapered drive socket and rotatable about a central axis of the drive socket, said spindle having a substantially flat face at an outer end thereof, which face defines a plane spaced from the power drawbar, a guard ring having a first surface that mates with the face of the spindle, a fastener to secure the guard ring to the spindle with the surface of the guard ring against the face of the spindle, said guard ring having an axial length in direction away from the face along the central axis of the drive socket, a tool holder having a tapered shank to fit in the tapered socket, said tool holder having a threaded internal bore along a central axis thereof, and a flange on the tool holder, cooperating drive elements between the flange and the guard ring which permits axial movement of the flange relative to the guard ring as the tool holder moves into the tapered socket, an axial length of the guard ring being sufficient so that the drive elements between the guard ring and the flange engage before the tool holder threaded bore engages the power drawbar.

4. A method of shielding a gap between a tool holder and a spindle having a power drawbar for pulling the tool holder toward the spindle under power comprising the steps of providing a guard ring having a first surface that mates with a face of the spindle, a fastener to secure the guard ring to the spindle with the surface of the guard ring against the face of the spindle, said guard ring surrounding the gap and having a drive lug to drivably engage the tool holder, providing an axial length on the guard ring sufficient so the drive lug drivably engages the tool holder before the power drawbar drivably engages the tool holder.

5. The method of claim 4 including the further step of moving the tool holder toward the spindle while drivably engaged by the ring until the power drawbar drivably engages the tool holder.

* * * * *